US012121998B2

(12) United States Patent
Ariyama et al.

(10) Patent No.: US 12,121,998 B2
(45) Date of Patent: Oct. 22, 2024

(54) BRAZING A STACKED BODY WITH A SCREEN

(71) Applicants: Mahle International GmbH, Stuttgart (DE); Mahle Filter Systems Japan Corporation, Tokyo (JP)

(72) Inventors: Masahiro Ariyama, Tokyo (JP); Yohei Hatano, Tokyo (JP); Hiroshi Kumagai, Tokyo (JP)

(73) Assignees: Mahle International GmbH (DE); Mahle Filter Systems Japan Corporation (JP)

( * ) Notice: Subject to any disclaimer, the term of this patent is extended or adjusted under 35 U.S.C. 154(b) by 0 days.

(21) Appl. No.: 17/798,069

(22) PCT Filed: Feb. 5, 2021

(86) PCT No.: PCT/EP2021/052765
§ 371 (c)(1),
(2) Date: Aug. 6, 2022

(87) PCT Pub. No.: WO2021/156417
PCT Pub. Date: Aug. 12, 2021

(65) Prior Publication Data
US 2023/0080566 A1  Mar. 16, 2023

(30) Foreign Application Priority Data
Feb. 7, 2020 (JP) .................. 2020-019366

(51) Int. Cl.
*B23K 35/02* (2006.01)
*B23K 1/00* (2006.01)
(Continued)

(52) U.S. Cl.
CPC ........ *B23K 35/0238* (2013.01); *B23K 1/0012* (2013.01); *B23K 1/008* (2013.01);
(Continued)

(58) Field of Classification Search
None
See application file for complete search history.

(56) References Cited

U.S. PATENT DOCUMENTS 2,817,895 A * 12/1957 Chill ................ B23K 35/3603
228/198
3,378,914 A * 4/1968 Miller .................... B23K 1/19
228/217
(Continued)

FOREIGN PATENT DOCUMENTS

CN   104854419 A   8/2015
CN   105473974 A   4/2016
(Continued)

OTHER PUBLICATIONS

Chinese Search Report dated Jun. 29, 2023 for CN202180012705.3 (w_translation).
(Continued)

*Primary Examiner* — Erin B Saad
*Assistant Examiner* — Carlos J Gamino
(74) *Attorney, Agent, or Firm* — Fishman Stewart PLLC

(57) ABSTRACT

A brazing sheet may be used for brazing under an atmosphere of an inert gas without flux. The brazing sheet may include at least three layers. The at least three layers may include a core material, a brazing material layer, and an intermediate layer. The at least three layers may be cladded by an outermost layer of the brazing material layer. The intermediate layer may be disposed on a face of the core material. The core material may be composed of a first aluminum alloy including at least one of (i) 0.20 weight % to 1.0 weight % of Cu, (ii) 0.8 weight % to 1.8 weight % of Mn, and (iii) 0.25 weight % to 1.5 weight % of Mg. The intermediate layer may be composed of a second aluminum
(Continued)

alloy including 0.20 weight % or less of each of Si and Fe and 0.10 weight % or less of each of Cu, Mn, and Cr.

20 Claims, 4 Drawing Sheets

(51) Int. Cl.
*B23K 1/008* (2006.01)
*B23K 1/19* (2006.01)
*B23K 1/20* (2006.01)
*B23K 35/28* (2006.01)
*B23K 35/38* (2006.01)
*B23K 101/14* (2006.01)

(52) U.S. Cl.
CPC ............... *B23K 1/19* (2013.01); *B23K 1/206* (2013.01); *B23K 35/286* (2013.01); *B23K 35/38* (2013.01); *B23K 2101/14* (2018.08)

(56) References Cited

U.S. PATENT DOCUMENTS

| | | | | |
|---|---|---|---|---|
| 3,941,293 | A * | 3/1976 | Chartet | B23K 1/008 228/183 |
| 4,701,127 | A * | 10/1987 | Dockus | B23K 1/008 432/198 |
| 5,340,015 | A * | 8/1994 | Hira | B23K 1/0008 228/205 |
| 6,031,751 | A * | 2/2000 | Janko | F28F 13/00 165/80.4 |
| 8,707,747 | B1 * | 4/2014 | Norris | B21D 47/00 428/116 |
| 2015/0053751 | A1 * | 2/2015 | Eckhard | B32B 15/016 164/76.1 |
| 2016/0199953 | A1 | 7/2016 | Wakamatsu | |
| 2016/0214215 | A1 | 7/2016 | Wakamatsu | |
| 2016/0250703 | A1 | 9/2016 | Bornegard | |
| 2017/0151638 | A1 | 6/2017 | Itoh | |
| 2018/0093355 | A1 * | 4/2018 | Sato | F28F 3/08 |
| 2019/0151973 | A1 * | 5/2019 | Itoh | B23K 35/286 |
| 2021/0031289 | A1 * | 2/2021 | Yanagawa | B23K 1/008 |
| 2021/0394313 | A1 * | 12/2021 | Yamayoshi | B23K 35/288 |
| 2022/0281040 | A1 * | 9/2022 | Yamayoshi | B32B 15/016 |
| 2023/0089422 | A1 * | 3/2023 | Ariyama | B23K 1/0012 |
| 2023/0117687 | A1 * | 4/2023 | Hashimoto | C22C 21/02 428/654 |

FOREIGN PATENT DOCUMENTS

| | | | |
|---|---|---|---|
| CN | 105705284 A | | 6/2016 |
| EP | 2803442 A1 | | 11/2014 |
| EP | 2848354 A1 | | 3/2015 |
| EP | 3459676 A1 | | 3/2019 |
| JP | 09085433 A | * | 3/1997 |
| JP | 2006035232 A | | 2/2006 |
| JP | 2006043735 A | | 2/2006 |
| JP | 2006175500 A | * | 7/2006 |
| JP | 2014-237142 A | | 12/2014 |
| JP | 2016-203193 A | | 12/2016 |
| JP | 2017-074609 A | | 4/2017 |
| WO | 2019035316 A1 | | 2/2019 |
| WO | 2019115422 A1 | | 6/2019 |
| WO | 2019151315 A1 | | 8/2019 |

OTHER PUBLICATIONS

Chinese Office Action dated Jun. 30, 2023 for CN202180012705.3 (w_translation).

* cited by examiner

BRAZING A STACKED BODY WITH A SCREEN

CROSS-REFERENCE TO RELATED APPLICATIONS

This application claims priority to International Patent Application No. PCT/EP2021/052765, filed on Feb. 5, 2021, and Japanese Patent Application No. JP 2020-019366, filed on Feb. 7, 2020, the contents of both of which are hereby incorporated by reference in their entirety.

TECHNICAL FIELD

The present invention relates to a brazing method capable of performing braze bonding under an inert gas atmosphere without requiring a flux, to a brazing sheet, and to a heat exchanger manufacturing method.

BACKGROUND

An aluminum alloy is used for a vehicle heat exchanger component in consideration of the thermal conductivity, specific weight, and formability thereof, and braze bonding of a plurality of constituent components that are press formed from a brazing sheet cladded with the aluminum alloy is generally applied as a manufacturing method thereof.

Brazing construction methods are, primarily, Control Atmosphere Brazing methods (hereinafter, CAB methods) performed in an atmosphere of an inert gas ($N_2$, Ar, or the like) at atmospheric pressure and utilizing a fluoride based flux, and Vacuum Brazing Methods (hereinafter, VB methods) performed under high vacuum and not utilizing flux.

In CAB methods, a non-corrosive fluoride based flux is coated during brazing to break down an oxide film on the brazing material layer of the cladded material, and the molten and flowed brazing material fills the gap between the adherend due to surface tension and causes a bond.

In VB methods, an aluminum alloy having Mg added to the brazing material layer or the core material of the cladded material are sent to a vacuum furnace or an aluminum alloy that has not had Mg added to the brazing material layer or the core material is sent to a vacuum furnace together with Mg (for example, see JP 2014-237142A, JP 2016-203193A, and JP 2017-74609A). Moreover, the Mg breaks down the oxide film on the brazing material layer of the cladded material during the brazing processing in the high temperature environment within the vacuum furnace, and furthermore, evaporated Mg captures traces of oxygen and moisture, which are brazing inhibitory substances which, exist near the surface, thereby enabling brazing.

SUMMARY

CAB methods have advantages in that they have comparatively quick formation cycles and inexpensive equipment costs, but they require a coating process for flux which breaks down the oxide film on the aluminum alloy surface and requiring a cleaning process for flux residue. Furthermore, there is risk of worsening of the work environment due to flux powder and effects on vehicle peripheral components due to insufficient removal of flux residue.

Flux is not needed in VB methods, and therefore the risks caused by flux are eliminated, but mass-productivity is low due to it being performed using batch processing, and manufacturing cycles are long. Furthermore, contamination within the vacuum furnace due to Mg and countermeasures thereto are required. Moreover, high vacuum conditions are required, and therefore manufacturing costs are high.

Accordingly, the need for brazing using a CAB method that does not use flux has increased in recent years, but in order to ensure brazing properties without flux, it is necessary to lower the melting point of the brazing material and increase the flowability.

However, there is a problem in that when flowability is increased, the brazing material causes erosion on the core material, whereby the core material strength is decreased, the brazing material cannot be effectively supplied to the bond portion, and satisfactory brazing and fillet formation cannot be achieved.

Accordingly, one aspect of the present invention is a brazing sheet used for brazing under an atmosphere of an inert gas without flux, having at least three layers and being cladded by an outermost layer of a brazing material layer via an intermediate layer on at least one face of a core material, wherein: the core material is composed of an aluminum alloy containing at least one element from among at least 0.20 weight % and no more than 1.0 weight % of Cu, at least 0.8 weight % and no more than 1.8 weight % of Mn, and at least 0.25 weight % and no more than 1.5 weight % of Mg; the intermediate layer is composed of an aluminum alloy prepared such that Si and Fe are respectively no more than 0.20 weight % and Cu, Mn, and Cr are respectively no more than 0.10 weight %; the brazing material layer is composed of an aluminum alloy containing at least 10 weight % and no more than 15 weight % of Si and at least 0.25 weight % and no more than 1.5 weight % of Mg, and has a melting point no more than 575° C. according to a DSC method; at least one layer among the intermediate layer and the brazing material layer contain at least 0.02 weight % and no more than 0.25 weight % of Bi; and a fluid coefficient of the brazing material layer on the side whereon the intermediate layer is disposed is, according to a drop type flow test, in a range of 0.40 to 0.60.

Another aspect of the present invention is the brazing sheet, wherein at least one layer among the core material, the intermediate layer, or the brazing material layer further contain an element having a higher vapor pressure than Mg at 577° C.

Another aspect of the present invention is the brazing sheet, wherein at least 0.01 weight % of at least one of Zn or Na is contained as the element having a high vapor pressure.

Another aspect of the present invention is the brazing sheet, wherein the intermediate layer contains at least 4.5 weight % of Zn.

Another aspect of the present invention is a brazing method, wherein plates obtained by forming the brazing sheet are stacked to assemble a heat exchange portion of a heat exchanger, and thereafter a position of the plates that overlap together when stacked is brazed and bonded.

Another aspect of the present invention is the brazing method, having a process wherein a stacked body of the plates is housed by a screen having a vertical cross sectional partition shape to cover and enclose a periphery of the stacked body, and thereafter, brazing is performed.

Another aspect of the present invention is the brazing method, wherein a minute gap is ensured between an inner wall face of the screen and a tip edge of the stacked body.

Another aspect of the present invention is the brazing method, provided with a brim portion at a periphery of a top end portion of the screen, wherein a lower face of the brim portion ensures an overlapping margin between the stacked body and the periphery, and furthermore, ensures a gap between it and a topmost portion of the stacked body.

Another aspect of the present invention is the brazing method, wherein the brazing sheet or the plates are chemically cleaned using an acid aqueous solution or an alkali aqueous solution before brazing.

Another aspect of the present invention is the brazing method, wherein the projection material is projected at a surface of the brazing sheet or the plates.

Another aspect of the present invention is a heat exchanger manufacturing method, having a process for brazing the heat exchanger according to the brazing method.

Another aspect of the present invention is the heat exchanger manufacturing method, wherein the heat exchanger is used for cooling a vehicle internal combustion engine or transmission lubricating oil.

According to the present invention described above, it is possible to inexpensively and cleanly improve brazing properties and mass-productivity without needing flux even substantially under atmospheric pressure without vacuum.

DETAILED DESCRIPTION

Figure 1:
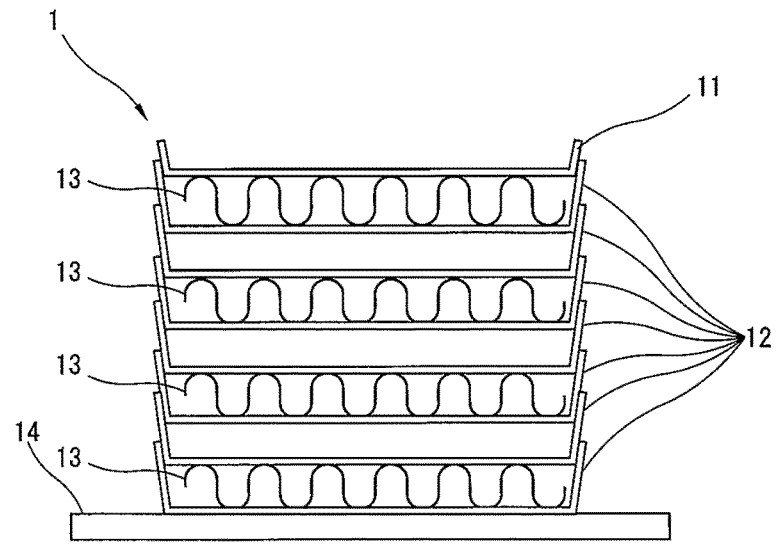
FIG. 1 shows an outline vertical cross sectional view illustrating a heat exchanger in an embodiment of the present invention.

Embodiments of the present invention will be described below with reference to drawings.

The brazing sheet, brazing method, and heat exchanger manufacturing method of the present invention perform brazing of a brazing sheet under an atmosphere of inert gas without needing flux, thereby inexpensively and cleanly improving brazing properties and mass-productivity More specifically, when manufacturing the heat exchanger, a brazing sheet for the heat exchanger is used for brazing under an atmosphere of an inert gas such as nitrogen or argon at nearly atmospheric pressure, thereby inexpensively and cleanly improving brazing properties and mass-productivity, and achieving erosion resistance and strength.

A brazing sheet, which is one aspect of the present invention, and a manufacturing process for a heat exchanger 1 using the same will be described with reference to FIGS. 1 to 4.

Brazing Sheet

The brazing sheet of the present invention is composed of a brazing sheet used in brazing under an atmosphere of an inert gas and without needing flux, the brazing sheet having at least three layers, being cladded by an outermost layer of a brazing material layer via an intermediate layer on at least one side of a core material.

The core material is composed of an aluminum alloy containing at least one or more elements from among at least 0.20 weight % and no more than 1.0 weight % of Cu, at least 0.8 weight % and no more than 1.8 weight % of Mn, and at least 0.25 weight % and no more than 1.5 weight % of Mg.

The intermediate layer is composed of an aluminum alloy prepared such that Si and Fe are respectively no more than 0.20 weight % and Cu, Mn, and Cr are respectively no more than 0.10 weight %.

The brazing material layer is composed of an aluminum alloy containing at least 10 weight % and no more than 15 weight % of Si and at least 0.25 weight % and no more than 1.5 weight % of Mg, and has a melting point no more than 575° C. according to a DSC method.

At least one layer among the intermediate layer and the brazing material layer contain at least 0.02 weight % and no more than 0.25 weight % of Bi.

The fluid coefficient of the brazing material layer on the side whereon the intermediate layer is disposed is, according to a drop type flow test, in a range of 0.40 to 0.60.

The brazing sheet of the present embodiment is used for brazing under an atmosphere of inert gas near atmospheric pressure without using flux. The brazing sheet of is an aspect of a brazing sheet having at least three layers, being cladded by an outermost layer of the brazing material layer via the intermediate layer on at least one side of the core material. More specifically, a brazing material layer having a lower melting point than the core material is provided on both faces of the core material, and due to controlling element impurities between the core material and the brazing material layer, disposing an intermediate layer having a high melting point and low grain boundary density achieves an aspect of a cladded material having a four layer structure having a function for inhibiting erosion of the core material.

When the intermediate layer further contains no more than 4.5 weight % of Zn, the breakdown of the oxide film during brazing facilitated, the fillet formation rate improves, and it is possible to offer a function as a sacrificial anode for inhibiting corrosion of the core material on the face side to which refrigerant (coolant) is supplied.

The brazing material layer, in particular, is prepared such that Mg is at least 0.25 weight %, whereby the aluminum oxide film on the aluminum alloy surface can be broken down. Furthermore, Mg evaporated from the brazing material layer captures brazing inhibiting factors, such as $O_2$ and $H_2O$, which accumulate near the brazing position. However, by preparing it such that Mg is no more than 1.5 weight %, excessive Mg diffusing to the cladded material surface during the brazing process is avoided, and the formation of an oxide film of Mg on the brazing material layer surface is inhibited, and therefore, worsening of brazing properties can be prevented.

Moreover, preparing it such that the fluid coefficient of the brazing material layer on the side whereon the intermediate layer is disposed is, according to a drop type flow test, in a range of 0.40 to 0.60 causes erosion from the brazing material to adjacent layers to be minimal, the brazing material to be effectively supplied to the bond, and a satisfactory fillet to be formed.

Figure 4:
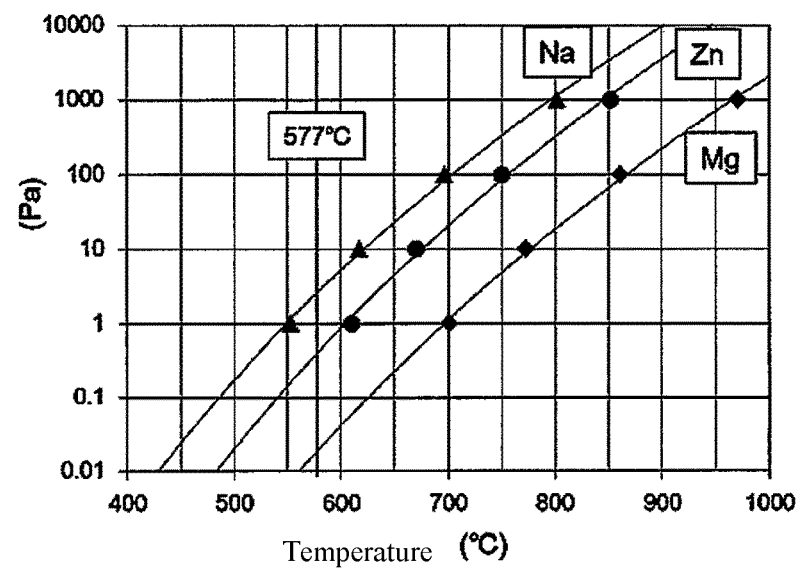
FIG. 4 shows a vapor pressure curve of elements used in the brazing of an embodiment of the present invention.

When the intermediate layer or the brazing material layer contain an element having a higher vapor pressure at 577° C. than Mg, the breakdown of the aluminum oxide film is facilitated and the fillet formation rate can be improved. At least 0.01 weight % of, for example, Zn or Na is contained as the element having a high vapor pressure (FIG. 4). In particular, a satisfactory fillet formation rate can be obtained when Zn in the intermediate layer is in a range of at least 0.01 weight % and no more than 4.5 weight %.

Moreover, when the intermediate layer or the brazing material layer contain a trace concentration of Bi, the thermal diffusion of the brazing process moves the brazing material layer, increases the flowability of the molten brazing material, and stabilizes brazing properties; in particular, when it is at least 0.02 weight %, the fillet formation rate and airtightness are satisfactory. However, the upper limit of 0.25 weight % is an upper limit based on an economical perspective since the effect does not change when more than this is added. Note that it is also possible to achieve stability of brazing properties when the core material layer is caused to contain Bi similar to the intermediate layer or the brazing material layer.

The brazing sheet described above is utilized as a cladded sheet used in the brazing process in the manufacturing process of the heat exchanger 1 of the present embodiment described below.

Manufacturing Process for Heat Exchanger 1

An example of manufacturing process S1 to S4 for the heat exchanger 1 will be described with reference to FIGS. 1 to 3.

In S1, an aluminum alloy having prepared the elemental components of the core material, intermediate layer, and brazing material layer of the brazing sheet is ingot cast, and thereafter, homogenization processing, hot rolling, and cold rolling are performed to produce a cladded sheet having a predetermined thickness. Furthermore, the cladded sheet is annealed at a predetermined temperature and finished to a desired tempering. Note, the intermediate layer of the present cladded material also offers an effect as a sacrificial anode layer, and therefore is configured as a four layer clad disposing the intermediate layer on the coolant path face side.

In S2, core plates 11 and 12, which are essential elements of the heat exchange portion of the heat exchanger 1 illustrated in FIG. 1, are produced from the cladded sheet. Specifically, the core plates 11 and 12 having predetermined dimensions are produced by stamp forming the cladded sheet.

The core plate 11 is, for example, produced using a plate disposed on the topmost portion of the heat exchanger 1 illustrated in FIG. 1. The core plates 12 are stacked in the height direction of the heat exchanger 1 illustrated in the same drawing and are produced using plates that alternatingly form spaces to allow a fluid to be cooled and a refrigerant to flow in the heat exchanger 1.

A base plate 14 and fin plates 13, which form the exchange portion together with the core plates 11 and 12, are produced from an aluminum alloy (for example, JISA3003 material) using a forming method or the like. In particular, the fin plates 13 are formed into a well-known cross sectional wave shape.

Figure 2:
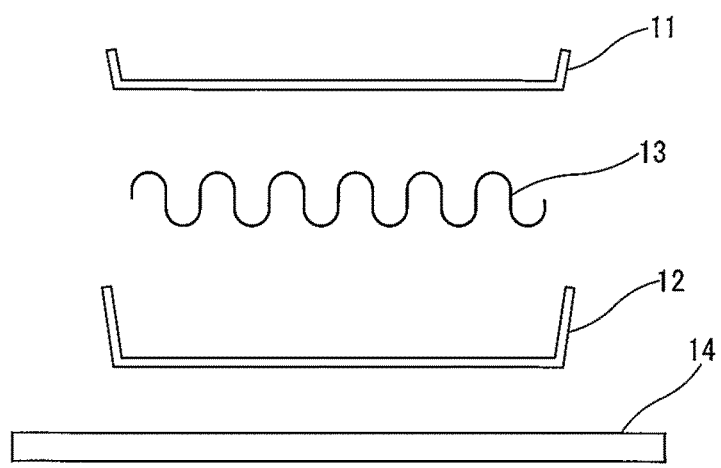
FIG. 2 shows an outline vertical cross sectional view illustrating constituent components of the heat exchanger in FIG. 1.

The formed body of the core plates 11 and 12, the fin plates 13, and the base plate 14 illustrated in FIG. 2 is suitably alkali cleaned at, for example, no more than pH5 or acid cleaned at, for example, at least pH9, and then further ultrasonic cleaned using pure water. Or, instead of cleaning in this manner, surface processing for improving brazing properties is performed by projecting a projection material at the surface of the core plates 11 and 12 by shot blasting and suitably breaking down the oxide film. Aluminum and sand are examples generally used as the projection material, but ferrous or resin projection materials are also possible. Note, the surface processing may be on a brazing sheet before it is worked into the core plates 11 and 12, the fin plates 13, and the base plate 14.

In S3, a jig is used to assemble the core plates 11 and 12, the fin plates 13, and the base plate 14 to appear as the stacked heat exchanger 1 as illustrated in FIG. 1. In particular, the core plates 11 and 12 are stacked such that the face side on which the intermediate layer is disposed faces the coolant path. Moreover, the stacked body formed from the core plates 11 and 12 is housed as a core portion 15 by a screen 2 illustrated FIG. 3. The screen 2 is located using locating means provided on the base plate 14, and a gap with the stacked body is fixed.

Figure 3:
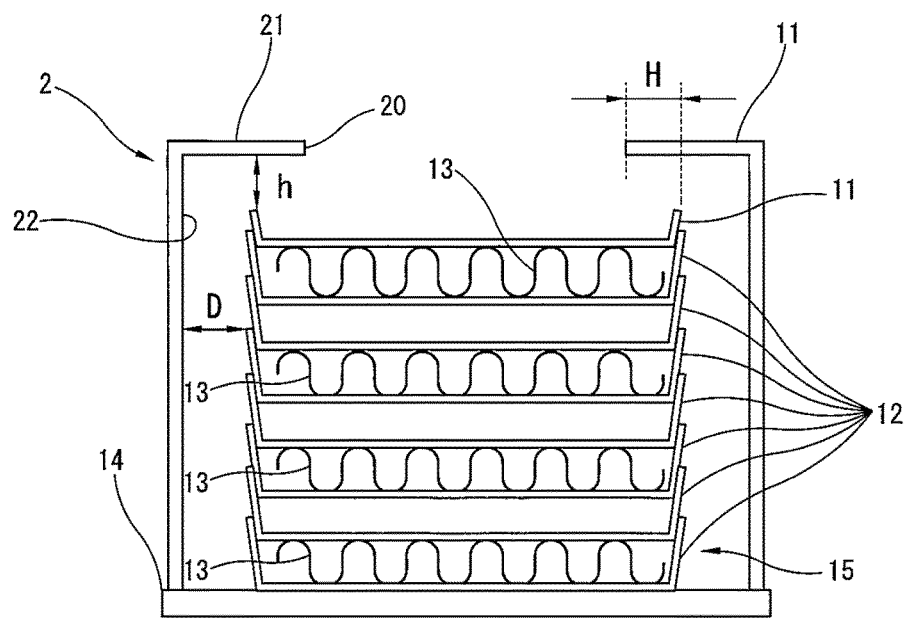
FIG. 3 shows an outline vertical cross sectional view illustrating the positional relationship between a screen and an assembled structure body of the heat exchanger used in the brazing of an embodiment of the present invention.

The screen 2 is a stainless (for example, SUS304 having a plate thickness of 1 mm) rectangular tube capable of housing the stacked body, and specifically is formed to the vertical cross sectional partition shape illustrated as an example in FIG. 3, and is disposed so as to cover and enclose the outer periphery of the stacked body. A minute gap D is ensured between the inner wall face 22 of the screen 2 and the tip edge of the stacked body.

Furthermore, an opening portion 20 is formed in the ceiling portion of the screen 2, and a brim portion 21 is provided on the inner periphery of the top end portion of the screen 2. The bottom face of the brim portion 21 ensures an overlapping margin H between the stacked body and the periphery, and furthermore, ensures a gap h between the stacked body and the topmost portion.

The screen 2 is composed of a thin metal sheet of stainless steel or another heat resistant metal having just enough heat resistance to be able to withstand the heating temperature during brazing, and is formed as a tube having a substantially quadrilateral cross section and enclosing the core portion 15. Specifically, the inner wall face 11a of the tube portion is formed along the outer border of the core plates 11 and 12 such that there is a specific minute gap D between it and the tip edges of a taper portion 4a of the core plates 11 and 12. That is, there is a specific minute gap D throughout the entire perimeter. It is desirable for the minute gap D to be at least 0.5 mm and no more than 5 mm, and is particularly desirable to be no more than 2 mm.

Furthermore, in a preferable embodiment, a brim portion 21 is disposed on the upper end of the tube portion enclosing the core portion 15 so as to cover the upper end of the minute gap D. Moreover, it is desirable for the gap h between the topmost portion of the core portion 15, which the brim portion 21 opposes, and the lower face of the brim portion 21 to be no more than 5 mm.

When the brim portion 21 is viewed from above as a projection, it may overlap the periphery of the core portion 15. The overlapping margin H of the brim portion 21 and the core portion 15 periphery is at least 0 mm. In other words, when viewed from above as a projection, at least the brim portion 21 and the core portion 15 are disposed continuously with no interstice. The overlapping margin H may be a suitably large value as well, but it is necessary for the top face of the screen 2 to have a sufficiently large opening so as to allow displacement of gas between the internal space of the screen 2 and external space. The overlapping margin H is preferably 5 mm.

Note, each of the foregoing dimensions are values at room temperature. In terms of the efficiency of the transfer of radiant heat from the furnace during brazing, it is desirable to have a larger heat receiving surface area on the top face of the core portion 3, and therefore, it is preferable to set the overlapping margin H of the brim portion 21 such that the heat receiving surface area is at least 70% of the top face surface area. When the overlapping margin H is 5 mm, if, for example, the external dimensions of the core plates 11 and 12 are is 80 mm×80 mm, the heat receiving surface area can be ensured to be at least 70%. Furthermore, the screen 2 is not limited to the steel material, but may be formed of another metal material.

In S4, the screen 2 housing the stacked body is sent to a brazing furnace (not illustrated) without any flux and brazing is performed under an inert gas atmosphere and temperature profile conditions based on a CAB method. Accordingly, the position at which the core plate 11 and the core plates 12 overlap in the stacked body and the position at which the core plates 12 overlap each other are brazed. Furthermore, the fin plates 13 are brazed to the core plate 11 and the core plates 12.

When brazing is performed without flux under an atmosphere of inert gas based on a CAB method, it is necessary to protect the braze bond position of the stacked body from trace amounts of oxygen and water vapor in the inert gas, oxygen and water vapor being inhibitory factors for brazing. In the CAB method, Mg evaporated from the brazing material layer of the brazing sheet cladded to the core plates 11 and 12 protects the bond positions from the foregoing oxygen and water vapor.

However, it is thought that the evaporated MG is excluded from near the bond position due to diffusion from airflow and the like inside the brazing furnace, and there is a risk of having insufficient brazing at the position.

In contrast to this, in the process in S4, the stacked body of core plates 11 and 12 is sent to the brazing furnace while housed by the screen 2, and therefore, the bond position is isolated from airflow and convective flow in the brazing furnace. Accordingly, diffusion of the evaporated Mg components is inhibited near the position, Mg retained nearby captures oxygen and water vapor, and therefore, brazing at the position is satisfactorily performed.

The heat exchanger 1 illustrated in FIG. 1 manufactured using S1 to S4 is used as a heat exchanger for a vehicle internal combustion engine or for transmission lubricating oil. In the heat exchanger 1, a refrigerant (for example, coolant) is supplied to the spaces between the core plates 11 and 12 and the core plates 12 interposed with fin plates 13. However, a fluid to be cooled (for example, oil) is supplied to the spaces between core plates 12 where there is no fin plate 13.

The brazing sheet, brazing method, and heat exchanger manufacturing method of the foregoing embodiment eliminate the drawbacks of CAB methods and VB methods and enable brazing that produces the benefits of both.

EXAMPLES

Examples of the present invention will be described below, but the present invention is not limited by these examples.

In S1, aluminum alloys prepared based on the components of the core material, intermediate layer, and brazing material layer shown in Table 1 were ingot cast, and thereafter, solution treatment, hot rolling, and cold rolling were performed to produce the 0.6 mm thick cladded sheets (clad 1 to 13) shown in Table 2. Thereafter, they were annealed at 380° C. and finished to a tempering O. The tempering O represents a state wherein annealing processing is completely performed and the material is softened. Note, in Table 1, the numerical values represent weight % values. Furthermore, "-" indicates a concentration of unavoidable impurities of less than 0.05 weight % (however, for the light doping element Bi, it indicates less than 0.01 weight %).

The melting point of the brazing material layer of each cladded sheet was measured using differential scanning calorimetry (DSC) under a nitrogen gas atmosphere in a measurement temperature range from 30° C. to 700° C., at a temperature elevation rate of 15° C./minute.

The fluid coefficient of the intermediate layer was determined using the following method.

The opposite side face from the intermediate layer of each cladded sheet was machined to remove 0.1 mm, and the brazing material layer was removed; thereafter, 60 mm long, 30 mm wide, and 0.5 mm thick strip shaped test pieces were prepared. The test pieces were suspended such that the length direction of the test pieces was in line with the direction of gravity, and then sent to a brazing furnace. During brazing, an atmosphere of nitrogen gas was used as the inert gas, and first, the temperature was raised from room temperature to 600° C. for a required duration of 30 minutes, then the 600° C. was held for 3 minutes, after which it was cooled from 600° C. to 450° C. for a required duration of four minutes, and furthermore, cooled to room temperature for a required duration of 15 minutes.

The fluid coefficient was calculated from the following equation.

$$\text{Fluid coefficient} = (4W_B - W_O)/(3W_O \times \text{cladding ratio} \times 1.2)$$

$W_O$: weight of test piece before brazing
$W_B$: weight of lower ¼ (15 mm) of test piece after brazing
Cladding ratio: cladding ratio of brazing material layer of the test piece before brazing.
1.2: cladding ratio correction coefficient due to working the thickness of the test pieces to 0.5 mm.

TABLE 1

| Aluminum Alloy | Si | Fe | Cu | Mn | Mg | Zn | Na | Bi |
|---|---|---|---|---|---|---|---|---|
| Brazing Material 1 | 12.0 | 0.10 | — | — | 0.63 | — | — | 0.25 |
| Brazing Material 2 | 10.0 | 0.10 | — | — | 0.63 | — | — | 0.25 |
| Brazing Material 3 | 14.0 | 0.10 | — | — | 0.63 | — | — | 0.25 |
| Brazing Material 4 | 7.5 | 0.10 | — | — | 0.63 | — | — | 0.25 |
| Brazing Material 5 | 12.0 | 0.10 | — | — | 0.25 | — | — | 0.25 |
| Brazing Material 6 | 12.0 | 0.10 | — | — | 1.5 | — | — | 0.25 |
| Brazing Material 7 | 12.0 | 0.10 | — | — | 0.63 | — | — | 0.02 |
| Brazing Material 8 | 12.0 | 0.10 | — | — | 0.63 | — | — | — |
| Brazing Material 9 | 12.0 | 0.10 | — | — | 0.63 | 3.0 | — | 0.25 |
| Brazing Material 10 | 12.0 | 0.10 | — | — | 0.63 | — | 0.01 | — |
| Brazing Material 11 | 12.0 | 0.10 | — | — | — | — | — | 0.25 |
| Intermediate Layer 1 | 0.10 | 0.10 | — | — | — | 1.5 | — | — |
| Intermediate Layer 2 | 0.10 | 0.10 | — | — | — | 1.5 | — | 0.25 |
| Core Material 1 | 0.75 | 0.10 | 0.20 | 1.5 | — | — | — | — |

TABLE 2

| Cladded Material | Brazing Material in | Intermediate Layer | Core Material | Brazing Material out | Brazing Material Melting Point (° C.) | Fluid Coefficient * |
|---|---|---|---|---|---|---|
| Clad 1 | Brazing Material 1 | Intermediate Layer 1 | Core Material 1 | Brazing Material 1 | 573 | 0.54 |
| Clad 2 | Brazing Material 2 | Intermediate Layer 1 | Core Material 1 | Brazing Material 2 | 573 | 0.41 |
| Clad 3 | Brazing Material 3 | Intermediate Layer 1 | Core Material i | Brazing Material 3 | 572 | 0.45 |
| Clad 4 | Brazing Material 5 | Intermediate Layer 1 | Core Material 1 | Brazing Material 4 | 575 | 0.40 |
| Clad 5 | Brazing Material 6 | Istermediale Layer 1 | Core Material 1 | Brazing Material 6 | 559 | 0.58 |
| Clad 6 | Brazing Material 7 | Intermediate Layer 1 | Core Material 1 | Brazing Material 7 | 573 | 0.48 |
| Clad 7 | Brazing Material 8 | Intermediate Layer 2 | Core Material 1 | Brazing Material 8 | 573 | 0.50 |
| Clad 8 | Brazing Material 9 | Intermediate Layer 1 | Core Material 1 | Brazing Material 9 | 572 | 0.59 |
| Clad 9 | Brazing Material 10 | Intermediate Layer 1 | Core Material 1 | Brazing Material 10 | 572 | 0.57 |
| Clad 10 | Brazing Material 1 | — | Core Material 1 | Brazing Material 1 | 574 | 0.84 |
| Clad 11 | Brazing Material 4 | Intermediate Layer 1 | Core Material 1 | Brazing Material 4 | 574 | 0.21 |
| Clad 12 | Brazing Material 8 | Intermediate Layer 1 | Core Material 1 | Brazing Material 8 | 573 | 0.30 |
| Clad 13 | Brazing Material 11 | Intermediate Layer 1 | Core Material 1 | Brazing Material 11 | 579 | 0.36 |

In S2, 80 mm square core plates 11 and 12 were produced by stamp forming the cladded sheet. The fin plates 13 and base plate 14 were produced using JISA3003 material. Next, surface processing was performed on the core plates 11 and 12, the fin plates 13, and the base plate 14 under the conditions shown in Table 3 using either an alkali cleaning at at least pH 9, acid cleaning at no more than pH 5, or shot blasting using sand as the projection material; thereafter, they were ultrasonic cleaned using pure water.

TABLE 3

| Chemical Cleaning | Chemical Components | Time | Temperature | Post-Processing |
|---|---|---|---|---|
| Acid Cleaning | HF1% + HNO₃ 2% aqueous solution | 90 Seconds | Room Temperature | Ultrasonically cleaned in pure water 1 minute × 2 times |
| Alkali Cleaning | NaOH 6% aqueous solution | 60 Seconds | Room Temperature | ↑ |

In S3, they were assembled to appear as the heat exchanger 1 illustrated in FIG. 1, and thereafter housed in the screen 2 illustrated in FIG. 3. In the present example, the specifications for the screen 2 and the positional relationship between it and the heat exchanger 1 are shown in Table 4.

TABLE 4

| Screen | Material | Plate Thickness (mm) | D (mm) | L (mm) | h (mm) |
|---|---|---|---|---|---|
| Type 1 | SUS304 | 1 | 1 | 5 | 1 |
| Type 2 | SUS304 | 1 | 5 | 5 | 1 |
| Type 3 | SUS304 | 1 | 10 | 5 | 1 |

In S4, the heat exchangers 1 of examples 1 to 11 and comparative examples 1 to 6 produced using the cladded materials 1 to 10 and surface processing conditions shown in Table 5 and housed in the screen 2 having specifications shown in Table 4 were sent to a brazing furnace based on a CAB method to perform brazing without using flux. Brazing conditions are shown below.

A mesh belt continuous aluminum brazing furnace was used as the brazing furnace and nitrogen was used as the inert gas.

Brazing was performed under conditions wherein oxygen concentration was 15 to 20 ppm and the dew point was −55° C. to −57° C. in a brazing furnace in a temperature zone of 450° C. to 600° C.

Temperature conditions were as follows: the temperature of the workpiece was measured, and temperature control was performed to raise the temperature from room temperature to 600° C. in 30 minutes, hold it at 600° C. for three minutes, and thereafter cool it from 600° C. to 450° C. in four minutes.

The heat exchangers 1 of examples 1 to 11 and comparative examples 1 to 6 obtained using the foregoing processes of S1 to S4 were evaluated for brazing properties, airtightness, and erosion resistance.

Brazing properties were evaluated as, "x: 90% or less, Δ: 90 to 99%, ○: 99 to less than 100%, ⊚: 100%, ⊚⁺: 100% and large fillets" based on a fillet formation rate defined as, "fillet formation rate=length of formed fillet/total length to be brazed".

Airtightness was evaluated as "○: no air leaks, x: air leaks" by performing an air leak test for one minute at a gauge pressure of 0.4 MPa and visually confirming in water whether there were air leaks.

Erosion resistance was evaluated based on depth of corrosion defined as the greatest distance corroded to adjacent layers (intermediate layer and core material layer when there is no intermediate layer provided) by the brazing material layer at the bond portion of the core plates 11 and 12 and the core plates 12 and 12 stacked in the heat exchanger 1 obtained in S4. Specifically, it was evaluated as "⊚: corrosion depth of no more than 10 μm, ○: no more than 50 μm, x: 50 μm or more, –: not evaluated" based on the corrosion depth.

The evaluation results of examples 1 to 11 and comparative examples 1 to 6 are shown in Table 5.

TABLE 5

| | Cladded Material | Surface Processilia | Screen | Air Tightness | Fillet Formation Rate | Erosion |
|---|---|---|---|---|---|---|
| Example 1 | Clad 1 | Alkali Cleaning | Type 1 | ○ | ◎ | ◎ |
| Example 2 | Clad 2 | Alkali Cleaning | Type 1 | ○ | ○ | ◎ |
| Example 3 | Clad 3 | Alkali Cleaning | Type 1 | ○ | ◎+ | ◎ |
| Example 4 | Clad 4 | Alkali Cleaning | Type 1 | ○ | △~○ | ◎ |
| Example 5 | Clad 5 | Alkali Cleaning | Type 1 | ○ | △~○ | ◎ |
| Example 6 | Clad 6 | Alkali Cleaning | Type 1 | ○ | △~○ | ◎ |
| Example 7 | Clad 7 | Alkali Cleaning | Type 1 | ○ | ○ | ◎ |
| Example 8 | Clad 8 | Alkali Cleaning | Type 1 | ○ | ◎+ | ◎ |
| Example 9 | Clad 9 | Alkali Cleaning | Type 1 | ○ | ◎+ | ◎ |
| Example 10 | Clad 1 | Acid Cleaning | Type 2 | ○ | ○ | ◎ |
| Example 11 | Clad 1 | Shot Blast | Type 1 | ○ | △~○ | ◎ |
| Comparative Example 1 | Clad 10 | Alkali Cleaning | Type 1 | ○ | △ | X |
| Comparative Example 2 | Clad 11 | Alkali Cleaning | Type 1 | X | X | — |
| Comparative Example 3 | Clad 13 | Alkali Cleaning | Type 1 | X | X | — |
| Comparative Example 4 | Clad 12 | Alkali Cleaning | Type 1 | X | X | — |
| Comparative Example 5 | Clad 1 | Alkali Cleaning | none | X | X | — |
| Comparative Example 6 | Clad 1 | Alkali Cleaning | Type 3 | ○ | X | ◎ |

The following effects from the present invention can be confirmed based on the evaluation results in Table 5.

In light of the comparison between examples 1 to 11 and comparative example 1, interposing an intermediate layer between the core material and the brazing material layer achieves a cladding ratio superior to comparative example 1, which was clad only by a brazing material layer, and therefore erosion resistance was improved. Furthermore, the intermediate layer contributed to improving the fillet formation rate (brazing properties).

In light of the comparison of examples 1 to 3 and comparative example 2, brazing properties improve as the concentration of Si in the brazing material layer increases, and a satisfactory effect is obtained at at least 10 weight %. In particular, example 3, which exceeded the eutectic point, had a fillet formation rate that was even further satisfactory.

In light of comparing examples 1, 4, 5 and comparative example 3, brazing properties are practically ensured when Mg concentration is at least 0.25 weight % and no more than 1.5 weight %. The concentration lower limit of 0.25 weight % is thought to be the lower limit concentration for breaking down the aluminum oxide film and for evaporated Mg to capture $O_2$ and $H_2O$, which are brazing inhibitory substances, near the brazing. However, the concentration upper limit of 1.5 weight % is in consideration of excess Mg not used for breaking down the aluminum oxide film forming a rigid oxidized magnesium film on the brazing material surface and conversely worsening the brazing properties. Furthermore, it is recognized that a brazing material layer not containing Mg not only cannot satisfy the brazing properties, but cannot satisfy airtightness either.

In light of the comparison between example 6 and comparative example 4, it is recognized that traces of Bi concentration in the brazing material layer stabilize the brazing properties, and in particular, when it is at least 0.02 weight %, airtightness and the fillet formation rate can be satisfied. It is thought that this is due to the trace amounts of Bi improving the flowability of the molten brazing material.

In light of the results of example 7, it is recognized that adding Bi to layers other than the brazing material layer such as the intermediate layer improves the effect of brazing properties, airtightness, and erosion resistance. This is thought to be due to Bi being able to easily thermally diffuse during the brazing process, and adding it to the intermediate layer or the core material rather than adding it directly to the brazing material layer causes thermal diffusion to the brazing material layer to be facilitated due to the heat in the brazing process (S4). Therefore, the brazing material layer, core material layer, or intermediate layer containing Bi can improve the effects.

In light of the results of examples 8 and 9, adding an element having a higher vapor pressure than Mg, for example, Zn or Na, to the intermediate layer or the brazing material layer (FIG. 4) further improves the fillet formation rate. The mechanism thereof is unclear, but it is presumed to be due, in addition to Mg breaking down the oxide film, there is a possibility that the high vapor pressure of Zn or Na may facilitate the breakdown of the oxide film. Note that it is recognized that when the element having a high vapor pressure is at least 0.01 weight % the fillet formation rate is improved.

In light of the results of example 10, performing chemical cleaning processing using an acid aqueous solution or an alkali aqueous solution before brazing further enables satisfactory brazing properties to be obtained.

In light of the results of example 11, performing a mechanical surface processing by shot blasting using a projection material before brazing had no effect on the brazing properties.

In light of the results of examples 1 to 11, comparative example 5, and comparative example 6, jointly using a screen capable of housing the stacked body of plates formed from the brazing sheet of the present invention in the brazing process enables a further facilitation of satisfactory brazing. In other words, housing the stacked body in the screen inhibits diffusion of Mg evaporated from the brazing material layer in the stacked body during brazing due to forced convection of the inert gas in the brazing furnace, and in addition, inhibits the supply of oxygen and water vapor, which are brazing inhibiting factors, through the inert gas to the stacked body, and therefore, satisfactory brazing can be facilitated.

As is clear in light of the results of the foregoing examples and comparative examples, according to the present invention, it is possible to manufacture a heat exchanger made of an aluminum alloy having satisfactory brazing properties even without using a flux and even in an atmosphere of inert gas substantially at atmospheric pressure without vacuum. Therefore, it is possible to braze an aluminum product capable of eliminating flux residue, which becomes an impure substance in a finished product, significantly improving the brazing environment, and achieving the same productivity and low equipment cost as a CAB method, for which flux was a prerequisite.

The invention claimed is:

1. A brazing method, comprising:
    forming at least one brazing sheet into a plurality of plates;
    stacking the plurality of plates to form a stacked body of a heat exchanger;
    housing the stacked body in a screen to cover and enclose a periphery of the stacked body; and
    brazing the stacked body under an atmosphere of inert gas without flux and bonding a portion of the plurality of plates that overlap each other;
    wherein:
        housing the stacked body in the screen includes forming an overlapping margin between the stacked body and a brim portion of the screen;
        at least 70% of a top face of the stacked body is disposed outside of the overlapping margin and defines a heat receiving surface area of the stacked body;
        the at least one brazing sheet includes at least three layers;
        the at least three layers includes a core material, a brazing material layer, and an intermediate layer;
        the at least three layers are cladded with an outermost layer being the brazing material layer;
        the intermediate layer is disposed on at least one face of the core material;
        the core material is composed of a first aluminum alloy including at least one of (i) 0.20 weight % to 1.0 weight % of Cu, (ii) 0.8 weight % to 1.8 weight % of Mn, and (iii) 0.25 weight % to 1.5 weight % of Mg;
        the intermediate layer is composed of a second aluminum alloy including 0.20 weight % or less of each of Si and Fe and 0.10 weight % or less of each of Cu, Mn, and Cr;
        the brazing material layer is composed of a third aluminum alloy including 10 weight % to 15 weight % of Si and 0.25 weight % to 1.5 weight % of Mg, the third aluminum alloy having a melting point of 575° C. or less according to a DSC method;
        at least one of the second aluminum alloy and the third aluminum alloy include 0.02 weight % to 0.25 weight % of Bi; and
        a fluid coefficient of the brazing material layer on a side on which the intermediate layer is disposed is, according to a drop type flow test, in a range of 0.40 to 0.60.

2. The brazing method according to claim 1, wherein:
    the stacked body is housed in the screen prior to brazing and bonding the plurality of plates; and
    the screen has a vertical cross sectional partition shape.

3. The brazing method according to claim 1, wherein housing the stacked body in the screen includes forming a minute gap between an inner wall face of the screen and a tip edge of the stacked body.

4. The brazing method according to claim 3, wherein:
    the brim portion is disposed at a periphery of a top end portion of the screen; and
    housing the stacked body in the screen further includes forming a gap between the brim portion and the top face of the stacked body.

5. The brazing method according to claim 4, wherein a dimension of the gap in a stacking direction of the stacked body is 5 mm or less.

6. The brazing method according to claim 3, wherein a dimension of the minute gap perpendicular to a stacking direction of the stacked body is 0.5 mm to 5 mm.

7. The brazing method according to claim 6, wherein the dimension of the minute gap is 2 mm or less.

8. The brazing method according to claim 1, further comprising, before brazing, chemically cleaning at least one of the at least one brazing sheet and the plurality of plates using at least one of an acid aqueous solution and an alkali aqueous solution.

9. The brazing method according to claim 1, further comprising projecting a projection material at at least one of the at least one brazing sheet and the plurality of plates before brazing.

10. The brazing method according to claim 1, wherein the overlapping margin extends 5 mm or less from an outer periphery of the top face of the stacked body.

11. The brazing method according to claim 1, wherein housing the stacked body in the screen further includes:
    arranging the stacked body and the screen on a base plate; and
    positioning the screen on the base plate using a locator disposed on the base plate.

12. The brazing method according to claim 1, wherein:
    the second aluminum alloy includes at least 0.01 weight % of an element having a higher vapor pressure than Mg at 577° C.; and
    the element having the higher vapor pressure than Mg is Na.

13. The brazing method according to claim 1, wherein the intermediate layer second aluminum alloy further includes at least 4.5 weight % of Zn.

14. A method of manufacturing a heat exchanger, comprising the brazing method of claim 5.

15. The method according to claim 14, wherein the heat exchanger is configured to cool at least one of a vehicle internal combustion engine and a transmission lubricating oil.

16. A heat exchanger manufacturing method, comprising:
    forming a plurality of brazing sheets into a plurality of plates;
    stacking the plurality of plates to form a stacked body;
    housing the stacked body in a screen having a cross sectional partition shape to cover and enclose a periphery of the stacked body; and
    brazing the stacked body in an atmosphere of inert gas without flux and boding a portion of the plurality of plates that overlap each other;
    wherein:
        housing the stacked body in the screen includes forming an overlapping margin between the stacked body and a brim portion of the screen;
        at least 70% of a top face of the stacked body is disposed outside of the overlapping margin and defines a heat receiving surface area of the stacked body;
        the plurality of brazing sheets each include at least three layers;

the at least three layers includes a core material, a brazing material layer, and an intermediate layer;

the at least three layers are cladded with an outermost layer being the brazing material layer;

the intermediate layer is disposed on at least one face of the core material;

the core material is composed of a first aluminum alloy including at least one of (i) 0.20 weight % to 1.0 weight % of Cu, (ii) 0.8 weight % to 1.8 weight % of Mn, and (iii) 0.25 weight % to 1.5 weight % of Mg;

the intermediate layer is composed of a second aluminum alloy including 0.20 weight % or less of each of Si and Fe and 0.10 weight % or less of each of Cu, Mn, and Cr;

the brazing material layer is composed of a third aluminum alloy including 10 weight % to 15 weight % of Si and 0.25 weight % to 1.5 weight % of Mg, the third aluminum alloy having a melting point of 575° C. or less according to a DSC method;

at least one of the second aluminum alloy and the third aluminum alloy include 0.02 weight % to 0.25 weight % of Bi; and a fluid coefficient of the brazing material layer on a side on which the intermediate layer is disposed is, according to a drop type flow test, in a range of 0.40 to 0.60.

17. The heat exchanger manufacturing method of claim 16, wherein housing the stacked body in the screen includes forming a minute gap between an inner wall face of the screen and a tip edge of the stacked body.

18. The heat exchanger manufacturing method of claim 17, wherein:

the brim portion is disposed at a top end portion of the screen; and housing the stacked body in the screen further includes forming a gap between a lower face of the brim portion and the top face of the stacked body.

19. The heat exchanger manufacturing method of claim 13, wherein:

at least one of the material first aluminum alloy, the second aluminum alloy, and the third aluminum alloy further includes at least 0.01 weight % of an element having a higher vapor pressure than Mg at 577° C.; and the element having the higher vapor pressure than Mg is Na.

20. A brazing method, comprising:

forming at least one brazing sheet into a plurality of plates;

stacking the plurality of plates to form a stacked body of a heat exchanger;

housing the stacked body in a screen to cover and enclose a periphery of the stacked body; and brazing the stacked body under an atmosphere of inert gas without flux and bonding a portion of the plurality of plates that overlap each other;

wherein:

housing the stacked body in the screen includes forming an overlapping margin between the stacked body and a brim portion of the screen;

at least 70% of a top face of the stacked body is disposed outside of the overlapping margin and defines a heat receiving surface area of the stacked body;

the at least one brazing sheet includes at least three layers;

the at least three layers includes a core material, a brazing material layer, and an intermediate layer;

the at least three layers are cladded with an outermost layer being the brazing material layer;

the intermediate layer is disposed on at least one face of the core material;

the core material is composed of a first aluminum alloy including at least one of (i) 0.20 weight % to 1.0 weight % of Cu, (ii) 0.8 weight % to 1.8 weight % of Mn, and (iii) 0.25 weight % to 1.5 weight % of Mg;

the intermediate layer is composed of a second aluminum alloy including 0.20 weight % or less of each of Si and Fe and 0.10 weight % or less of each of Cu, Mn, and Cr;

the brazing material layer is composed of a third aluminum alloy including 10 weight % to 15 weight % of Si and 0.25 weight % to 1.5 weight % of Mg, the third aluminum alloy having a melting point of 575° C. or less according to a DSC method;

at least one of the second aluminum alloy and the third aluminum alloy include 0.02 weight % to 0.25 weight % of Bi;

a fluid coefficient of the brazing material layer on a side on which the intermediate layer is disposed is, according to a drop type flow test, in a range of 0.40 to 0.60;

the second aluminum alloy includes an element having a higher vapor pressure than Mg at 577° C.; and the element having the higher vapor pressure than Mg is Na.

* * * * *